United States Patent
Whittington et al.

(10) Patent No.: US 7,180,530 B2
(45) Date of Patent: Feb. 20, 2007

(54) VISUAL DISPLAY TESTING, OPTIMIZATION AND HARMONIZATION METHOD AND SYSTEM

(76) Inventors: Amy Whittington, 8950 Mountain Ridge Cir., Ball Ground, GA (US) 30107; William Dunn, 4445 Burgess Hill La., Alpharetta, GA (US) 30022

( * ) Notice: Subject to any disclaimer, the term of this patent is extended or adjusted under 35 U.S.C. 154(b) by 292 days.

(21) Appl. No.: 10/973,012

(22) Filed: Oct. 25, 2004

(65) Prior Publication Data

US 2005/0062704 A1    Mar. 24, 2005

Related U.S. Application Data (63) Continuation of application No. 10/244,577, filed on Sep. 16, 2002, now Pat. No. 6,809,746.

(60) Provisional application No. 60/322,086, filed on Sep. 14, 2001.

(51) Int. Cl.
G09G 5/10      (2006.01)

(52) U.S. Cl. .................. 345/690; 345/89; 345/904; 348/184; 348/189

(58) Field of Classification Search ............ 345/87–89, 345/690, 694, 904; 348/180, 182, 184, 189–192, 348/142; 382/141
See application file for complete search history.

(56) References Cited

U.S. PATENT DOCUMENTS

| | | | |
|---|---|---|---|
| 4,870,357 A | 9/1989 | Young | 324/158 R |
| 5,293,178 A | 3/1994 | Kobayashi | 345/87 |
| 5,298,993 A | 3/1994 | Edgar | 348/180 |
| 5,351,201 A | 9/1994 | Harshbarger | 364/551.01 |
| 5,537,145 A | 7/1996 | Miseli | 348/181 |
| 5,572,444 A | 11/1996 | Lentz | 364/551.01 |
| 5,638,167 A | 6/1997 | Nakamura | 356/121 |
| 5,650,844 A | 7/1997 | Aoki | 356/237 |
| 5,686,959 A | 11/1997 | Hayashi | 348/126 |
| 5,717,780 A | 2/1998 | Mitsumune | 382/141 |
| 5,734,158 A | 3/1998 | Nagashima | 250/225 |
| 5,740,352 A | 4/1998 | Philipp | 395/183.16 |
| 5,764,209 A | 6/1998 | Hawthorne | 345/87 |
| 5,771,068 A | 6/1998 | Sali | 348/92 |
| 5,793,221 A | 8/1998 | Aoki | 324/770 |
| 5,801,545 A | 9/1998 | Takekoshi | 324/770 |
| 5,933,018 A | 8/1999 | Komatsu | 324/755 |
| 5,969,756 A | 10/1999 | Buckley | 348/190 |
| 6,014,035 A | 1/2000 | Taniguchi | 324/770 |
| 6,177,955 B1 | 1/2001 | Downen et al. | 348/189 |
| 6,559,826 B1 | 5/2003 | Mendelson et al. | 345/102 |
| 6,600,468 B1 | 7/2003 | Kim | 345/87 |
| 6,611,249 B1 | 8/2003 | Evanicky et al. | 345/102 |

*Primary Examiner*—Dennis-Doon Chow
(74) *Attorney, Agent, or Firm*—Greenberg Traurig LLP (57) ABSTRACT

A method and system for automatically testing visual displays and automatically optimizing the voltage settings for each visual display being tested by harmonizing and tailoring the voltage settings applied to the display and automatically setting into memory the coefficients to achieve the optimized voltage levels for each visual display.

14 Claims, 7 Drawing Sheets

VISUAL DISPLAY TESTING, OPTIMIZATION AND HARMONIZATION METHOD AND SYSTEM

CROSS-REFERENCE TO RELATED APPLICATION

This application is a continuation of U.S. application Ser. No. 10/244,577, filed Sep. 16, 2002, now U.S. Pat. No. 6,809,746, which is claims the benefit of Provisional Application No. 60/322,086, filed Sep. 14, 2001 incorporated herein by reference.

The present application claims priority from and hereby incorporates by reference the substance of Provisional Application No. 60/322,086, filed Sep. 14, 2001.

BACKGROUND AND SUMMARY OF THE INVENTION

This invention relates generally to the automated testing, optimization and harmonization of the performance measurements of visual displays. Currently, systems are available to automatically test visual displays by providing measurements on display characteristics (for example: luminance, transmission level, contrast ratio, luminance uniformity, chromaticity uniformity, viewing angle dependence, and luminous efficiency) of the visual displays. Current systems may be capable of measuring, gathering and comparing the display characteristics. Some even enhance the value of a certain display characteristics, such as luminance uniformity, to the detriment of other characteristics, such as contrast ratio. They do not, however, automatically provide for the optimization of all display characteristics as may be done by the present invention. The present invention may be used with any standard automated or non-automated system for testing digital flat panel displays. One such automated system for measuring the optical performance of a visual display under test is the method described in U.S. Pat. No. 6,177,955 (which is hereby incorporated by reference in its entirety) and is embodied in the Display Tuning System manufactured by Westar Corporation located in St. Louis, Mo.

One type of visual display that can be tested, optimized and harmonized with the present invention is an active matrix liquid crystal display (AMLCD). AMLCD's are well known in the art, and depend on thin film transistors (TFT's) and capacitors to maintain an isolated charge at each subpixel until the next refresh cycle. They are arranged in a matrix on one of the glass panels between which is sandwiched the liquid crystal material. To address a particular subpixel, a gate voltage is applied to a row, switching on that row's transistors and thereby letting that row's subpixels accept a charge. Voltages ("gray level voltages") are applied to the columns corresponding to the light transmission level desired at individual subpixel elements at the intersection of the column and row in question. Since the other rows that the column intersects are turned off, only the capacitor at the designated subpixel receives a charge from a particular column.

The voltage potential differential between the front glass panel and a subpixel TFT controls the amount of "untwisting" accomplished by the twisted nematic liquid crystalline material at the subpixel element. This level of untwisting, in turn, determines the amount of light, which the material permits to pass through the front glass panel. By controlling the voltage applied to the subpixels, LCD's can create a gray scale. In one type of LCD monitor the liquid crystals organize into a structure that makes the subpixels transparent in the absence of a voltage differential.

A net voltage potential should not be maintained across the cell gap between the glass plates for an appreciable time or electroplating of the liquid crystalline material will occur, and image retention will result. A variety of driving schemes are known in the field to avoid the said electroplating phenomenon. One way to avoid electroplating is to minimize the voltage potential being maintained across the cell gap by supplying an alternating polarity voltage potential to each subpixel TFT relative to the common voltage of the opposite plate (Vcom).

Knowing the voltage applied to a given subpixel TFT and the common voltage of the opposing plate (Vcom) will not directly determine the actual voltage potential present at each subpixel element. TFT electrical distortion and threshold offsets, among other factors, cause the charge present at a subpixel TFT to differ in an undetermined way from the applied voltage. As there is no way to directly measure this charge present at the TFT, the only way to determine the actual voltage potential of a subpixel element is through indirect means, such as by measuring the resulting level of light transmission.

With respect to the alternating voltage potentials applied to the subpixel TFT's, if the magnitude of the positive and negative potentials at the subpixels relative to Vcom are different the light transmission level will appear to flicker as the panel refreshes. This flickering occurs because the liquid crystal switches from one orientation to the opposite depending on the polarity of the potential, and the magnitude of light transmission is determined by the magnitude of that potential. If the magnitude of the positive potential differs from the magnitude of the negative potential, the light transmission changes as the waveform changes from positive to negative, and vice versa. This "unbalanced" state resulting in flicker increases the likelihood of electroplating since a nonzero voltage potential is effectively maintained across the cell gap. "Harmonizing" an LCD display implies balancing, or correcting, this unbalanced state.

By electrically balancing, or harmonizing, a panel to a high degree of accuracy, the present invention prevents image retention, as described above, and allows for the setting of the optimum, or maximum, voltage potential range, resulting in, among other characteristics, maximum contrast ratio and maximum luminance, or light transmission level. Monotonicity is maintained and flicker is minimized. Through automation, the present invention provides for a time-efficient and highly repeatable method of harmonizing panels by generating voltage setting correction factors and storing them into memory that is incorporated into the display panel. The harmonization optimizes the panel's viewing characteristics irrespective of viewing angle.

End users frequently desire tailored light transmission level versus gray scale voltage curves ("gamma curves") depending on their applications. While harmonizing as described, the present invention may also provide for the tailored adjustment of the gamma curve through correction factors to fit the user's request.

An exemplary embodiment of the present invention is to a system and method for automatically optimizing the display performance characteristics for a visual display by harmonizing and tailoring the display's voltage settings and storing into memory the voltage level correction factors for each visual display.

The exemplary embodiments herein disclosed are not intended to be exhaustive or to unnecessarily limit the scope of the invention. The exemplary embodiments were chosen and described in order to explain the principles of the preset invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

DETAILED DESCRIPTION OF THE EXEMPLARY EMBODIMENT(S)

In accordance with the foregoing summary, the following presents a detailed description of the exemplary embodiments of the invention that is currently considered to be the best mode.

Figure 1:
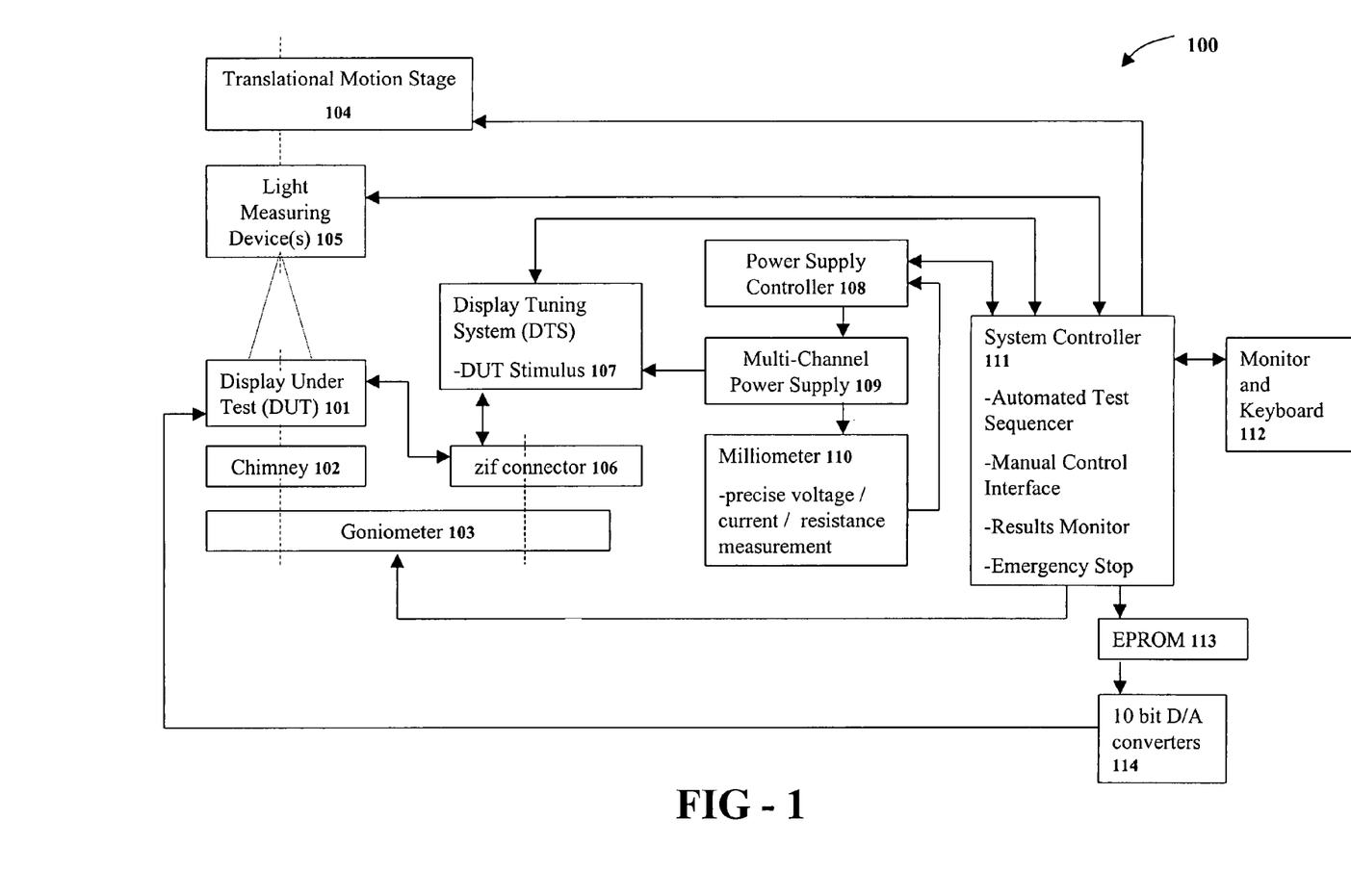
FIG. 1 is a block diagram of a visual display testing system as generally described in U.S. Pat. No. 6,177,955 according to an exemplary embodiment of the invention.

FIG. 1 is a block diagram of visual display testing and harmonization system 100 arranged in accordance with the invention to: a) subject the display under test (DUT) to a standard battery of testing procedures and measure the display's performance for success or failure and; b) conduct and implement the optimization process of the present invention.

In FIG. 1, DUT 101 is attached to a "chimney" apparatus 102 which is itself attached to goniometer 103. The chimney apparatus may generally be a square tube frame with a backlight on one end to illuminate the DUT that is attached to the other end. The four sides, being opaque, substantially prevent light from diffusing into the testing area and serve to set the DUT at a distance from the backlight.

Figure 2:
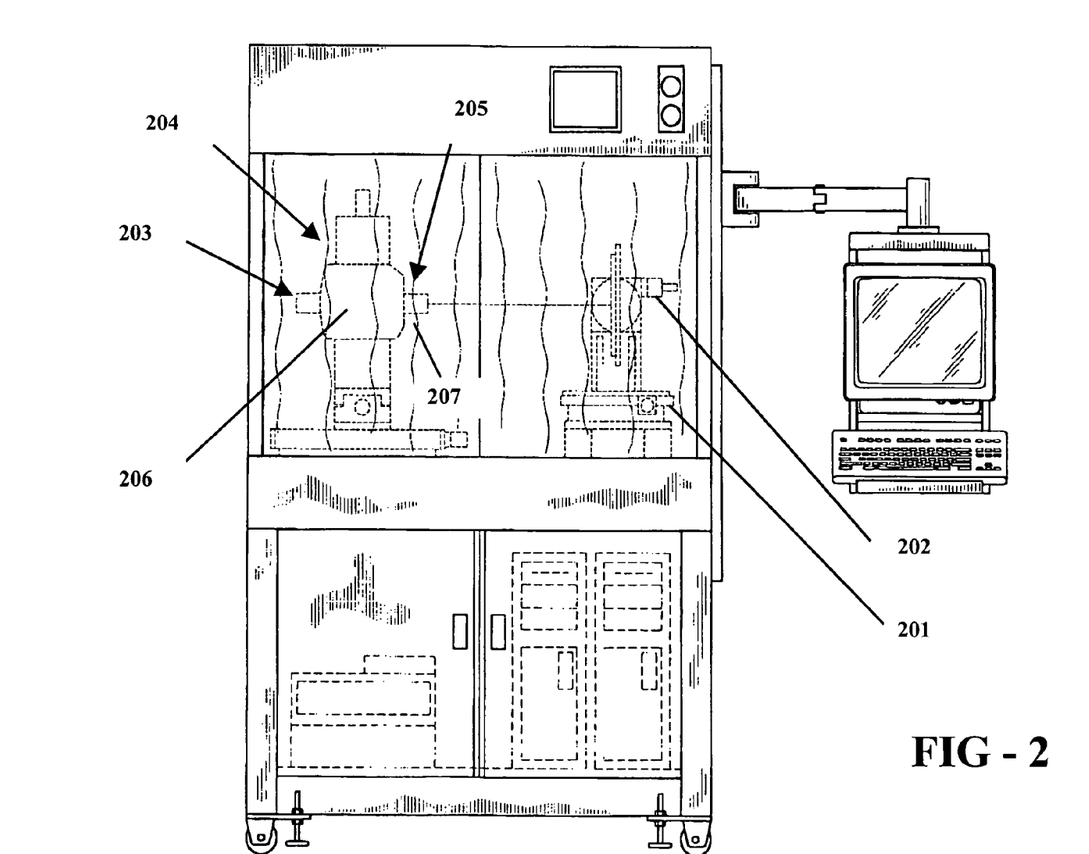
FIG. 2 is the front elevation of the apparatus in FIG. 1, in accordance with an exemplary embodiment of the present invention.

The goniometer 103, or rotational stage, may include elevation 201 and azimuthal 202 rotary tables, as seen in FIG. 2, for rotating DUT 101 about at least one of two generally orthogonal axes. The translational motion stage 104 in FIG. 1 may include three linear tables, 203, 204, 205 in FIG. 2, each positioned in one of three generally orthogonal directions. An instrument deck, 206 in FIG. 2, attached to the translational motion stage may hold the light measuring devices 105 necessary to perform the testing and harmonization routines. One such device is a photomultiplier tube (PMT) photometer 207 for providing luminance measurements.

A "zif" connector, 106 in FIG. 1, or any other suitable type of connector may be attached to goniometer 103 and provide for easy coupling of DUT 101 to the DUT stimulus 107, of which an exemplary embodiment is the Westar Display Tuning System (U.S. Pat. No. 6,177,955). The DUT stimulus 107 drives the DUT.

Power supply controller 108, which may be embodied by a portable computer, may control multi-channel power supply 109 and milliometer 110, which in turn power the DUT and monitor the voltages used to drive the DUT. System controller 111, which may be embodied by a portable computer, may tie the components together by initiating testing sequences, controlling positioning stages 104 and 103 and recording results, and may provide for external interfaces, such as keyboard and monitor interface 112. System controller 111 may also store the resulting harmonization coefficients into portable memory, embodied by the EPROM chip 113 which may be attached to the DUT in this exemplary embodiment. D/A converters 114 may also be attached to the DUT, and accomplish the harmonization when the DUT is subsequently driven by the end-user.

FIG. 2 shows an elevational view of the exemplary embodiment of the apparatus. The apparatus may be in the form of a bench-top arrangement with about 3 sides and a curtain blocking ambient light when the testing is in progress. However, the automatic nature of the harmonization and optimization method embodied in the present invention also allows for an assembly-line arrangement.

Figure 3:
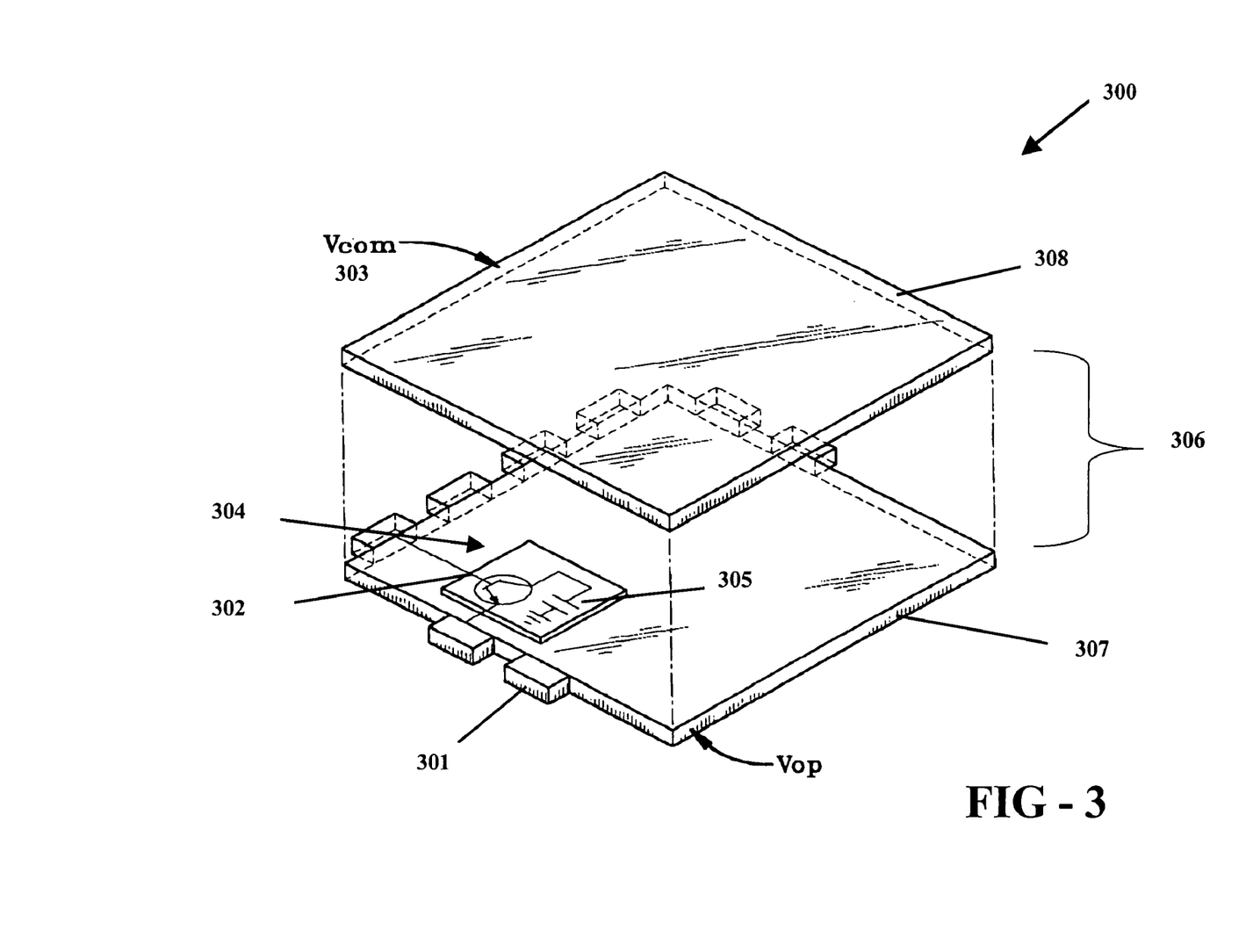
FIG. 3 is a drawing of an exemplary active matrix liquid crystal display panel subpixel element.

FIG. 3 shows AMLCD subpixel 300. TFT 304 is situated between the back glass panel 307 and cell gap 306. Cell gap 306 is filled with liquid crystal material. Front glass panel 308 may be coated on the inner side with a transparent conductive material which effectively transforms the front glass panel into a single electrode, capable of maintaining a single voltage potential, designated as Vcom 303. Row, or gate, electrode 302 switches on TFT 304, enabling TFT 304 to store a charge from column, or data, electrode 301. Gray shade voltages drive the column electrodes. A capacitor 305 in series with TFT 304 maintains the charge until the next refresh cycle. The voltage potential differential across cell gap 306 resulting from the charged TFT 304 and Vcom 303 drives the liquid crystal material to change orientation, or "untwist," which in turn changes the optical properties of the liquid crystal material, thereby changing the amount of light passing through front panel 308.

Figure 4A:
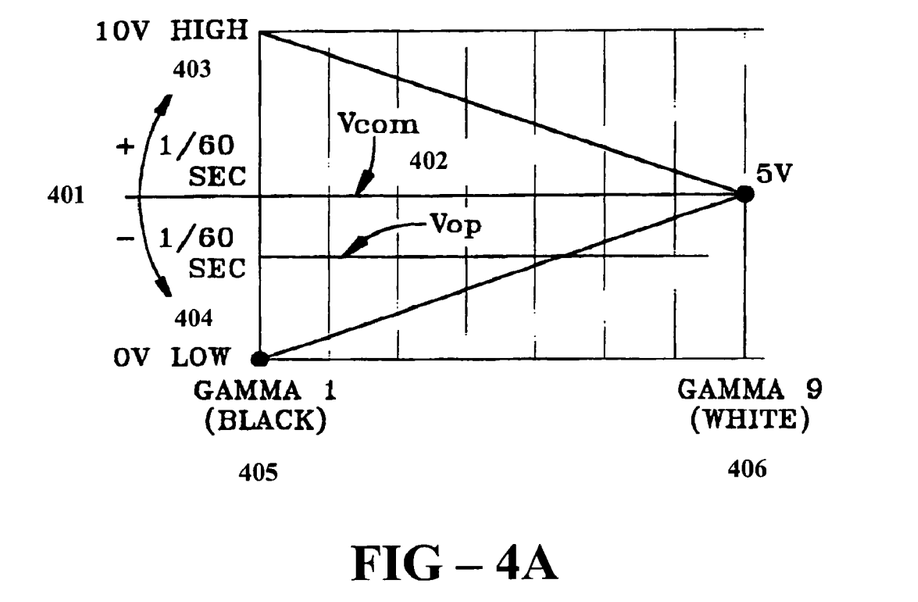
FIGS. 4A and 4B are graphs showing the subpixel drive scheme, in accordance with one embodiment of the present invention.
Figure 4B:
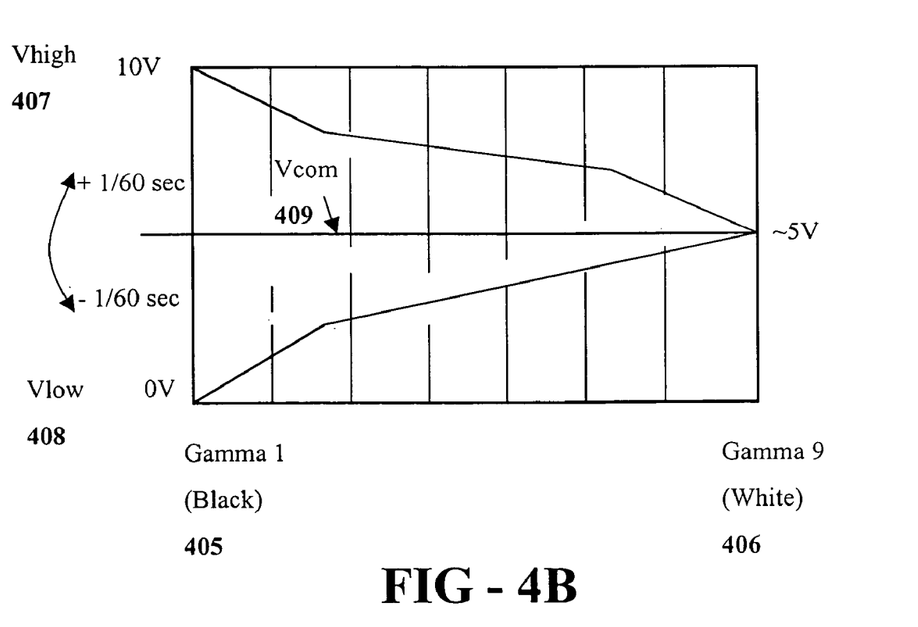

FIGS. 4A and 4B are graphical representations of the general nature of the drive scheme of an exemplary embodiment of the invention. The abscissa in these figures comprise nine "gamma" voltage levels, or gray scale voltage increments, but it is to be understood that the number of gamma levels can be any integer, n, depending on the particular drive system and video controller. In this embodiment, then, a gamma level of 1 corresponds to one-ninth full gray scale voltage.

As shown in FIGS. 4A and 4B, the gray scale voltages (voltages applied to the AMLCD columns) of the exemplary embodiment of the invention comprises voltage pairs of opposite polarity with respect to the common voltage of the opposite plate, Vcom (303, 402 and 409). The polarity reverses at a known frequency 401. Voltages greater than Vcom are designated as "Vhigh", 403 and 407, while voltages lower than Vcom are designated as "Vlow", 404 and 408. In a perfectly balanced system, the average voltage of Vhigh and Vlow actually present at the subpixels will be equal to Vcom. It should be noted that the voltage actually present at the subpixels is different than the voltage applied to the subpixel due to TFT considerations discussed above. FIGS. 4A and 4B demonstrate voltage applied to the subpixels.

Default values for gamma voltages are demonstrated in FIG. 4A. Although the default voltages are arbitrary, the present embodiment of the system sets these voltage pairs to be centered around the default Vcom (402), which may be generally equal to about 5V, in a linear fashion. That is, the different polarities of each gamma pair—Vhigh (403) and Vlow (404)—are equidistant from Vcom and the gamma pairs decrease generally in a linear fashion from gamma 1 (405) to gamma 9 (406).

FIG. 4B demonstrates typical optimized voltage pair settings. As shown, the voltage pairs are generally not equidistant from Vcom and do not generally decrease in a linear fashion from gamma 1 (405) to gamma 9 (406). The asymmetry of the optimized Vhigh (407) and Vlow (408) settings around the optimized Vcom (409) is generally caused by the fact that the actual voltage present at the subpixels is different than voltage as applied depending generally on TFT offset and distortion, which offset and distortion are different depending on the applied voltage level. The general non-linearity in stepping from gamma 1 to gamma 9 is generally due to the light transmission tailoring accomplished for individual end-users—an end user's light transmission level need at, e.g., gamma level 3 might be different from light transmission level need at gamma levels 4 and 5, which voltage pair requirements necessary to achieve said light transmission levels will generally not step through gamma levels in a linear fashion.

Figure 5:
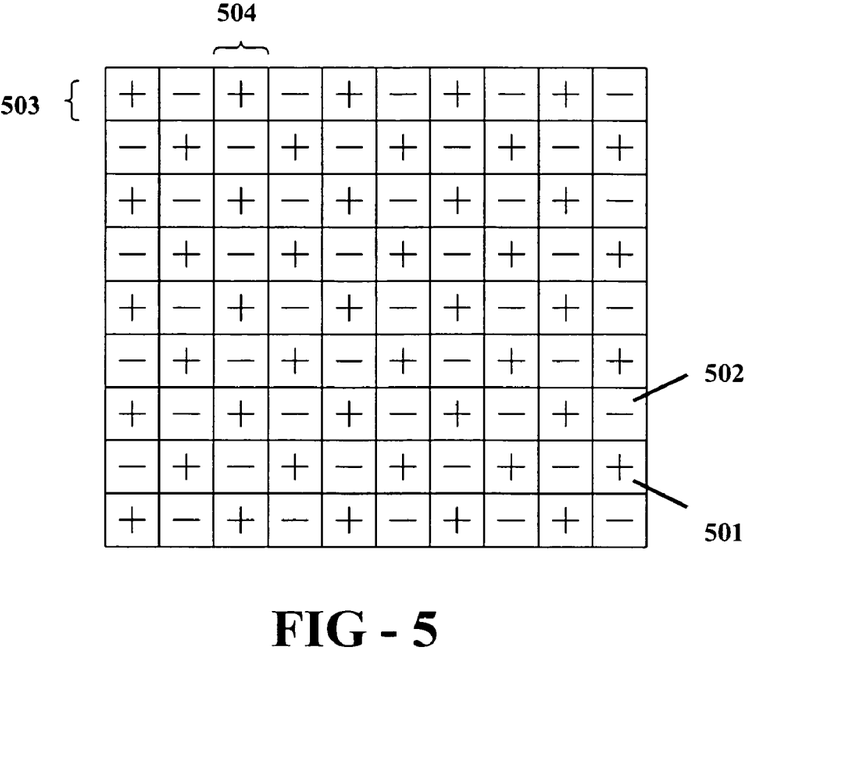
FIG. 5 is an illustration of the relative polarities of subpixel elements of a liquid crystal display panel, in accordance with one embodiment of the present invention.

FIG. 5 is a representation of the relative subpixel polarities achieved by the drive scheme of the exemplary embodiment of the invention. A plus symbol 501 indicates that the particular subpixel is currently being driven from the Vhigh set of voltage coefficients, which set is stored in memory. A minus symbol 502 indicates that the particular subpixel is currently being driven from the Vlow set of voltage coefficients, which set is also stored in memory. As shown, subpixel polarity is varied by row 503 and by column 504, such that a checkerboard arrangement of polarities, for example, is achieved.

Figure 6:
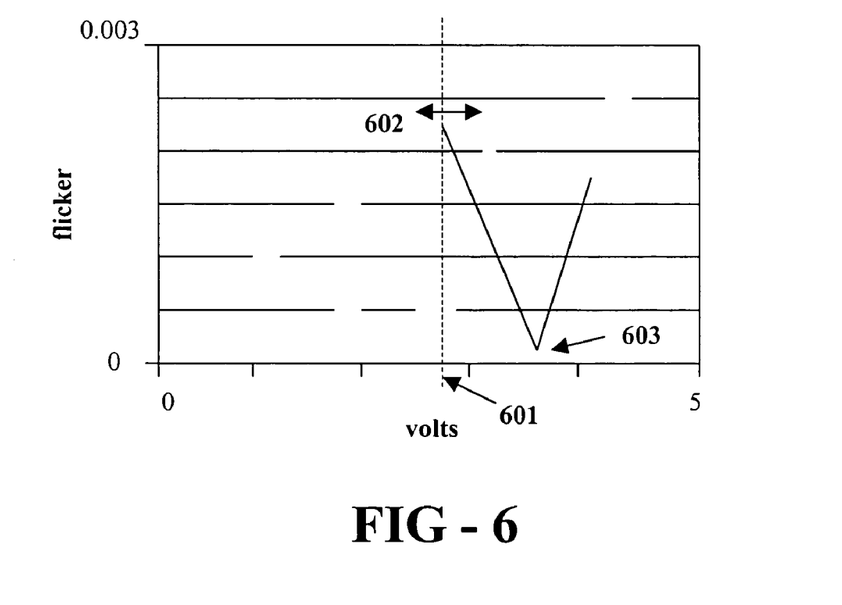
FIG. 6 is a graph depicting the process for minimizing flicker, in accordance with one embodiment of the present invention.

The process of electrically balancing, or minimizing flicker, is demonstrated in FIG. 6. Flicker is a phenomena that occurs when the front and back AMLCD panels are unbalanced, as described above. The equipment necessary to measure flicker is commonly available; one such apparatus being the Display Tuning System manufactured by Westar Corporation (U.S. Pat. No. 6,177,955). The process shown in FIG. 6 may be performed for each gamma level and comprises choosing an initial voltage 601 that is in proximity to the default voltage (either Vcom 402 or a gamma level voltage pair 403/404), making a flicker measurement 602, and incrementally varying said voltage to take another flicker measurement. This process may be repeated until either a predetermined number of incremental voltage steps has been achieved, or until enough measurements have been taken to ensure the flicker minimum 603 has been determined. It is to be understood that curve fitting is contemplated by the present invention to reduce the number of steps necessary to determine when the flicker minimum has been reached. It is also to be understood that said curve fitting and the choice of said initial default voltage setting can be aided by historical data from flicker minimization routines performed on similar display panels as the DUT 101.

Figure 7:
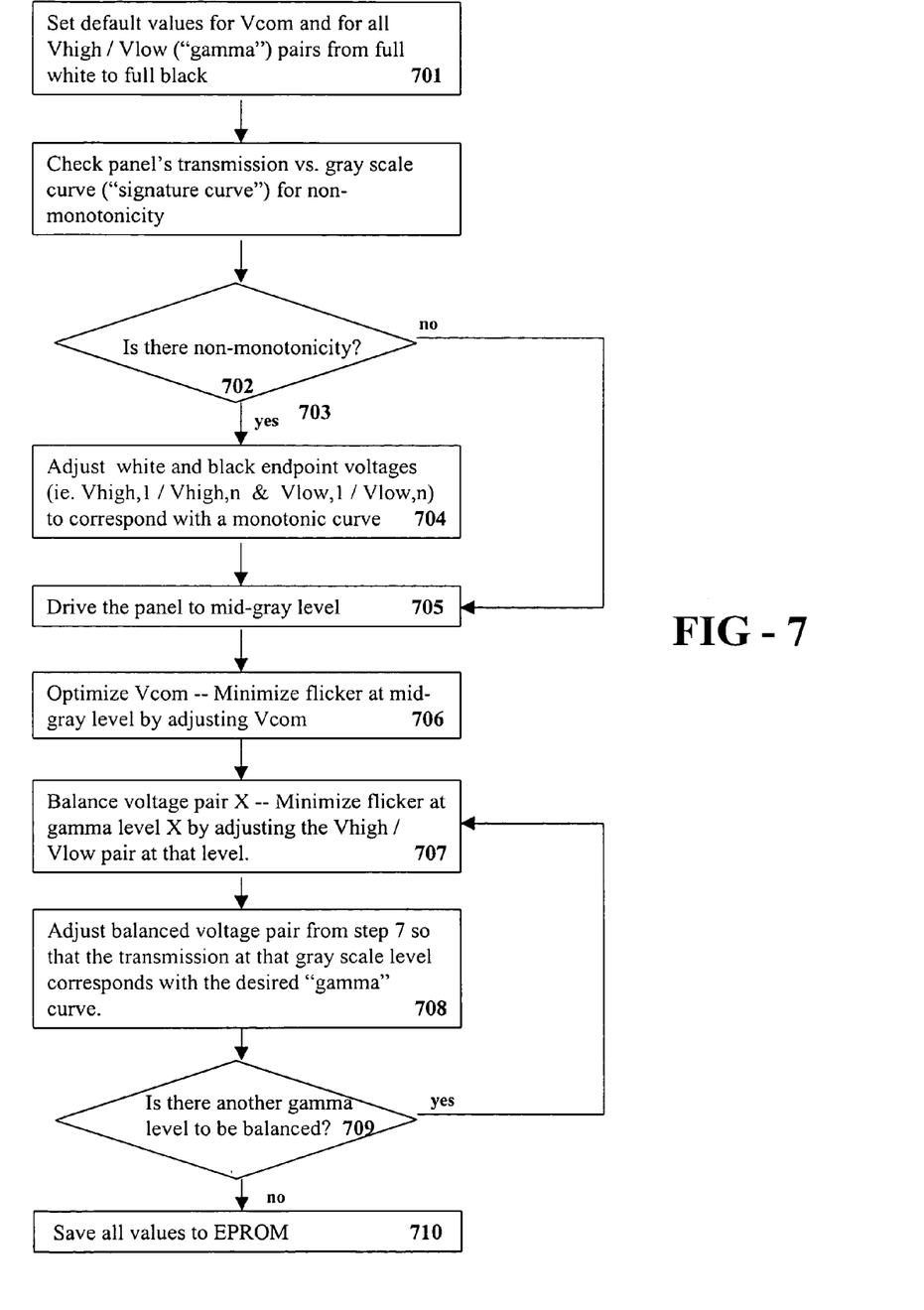
FIG. 7 is a schematic representation of an exemplary embodiment of the present invention.

The process contemplated by the exemplary embodiment of the present invention may be initiated in step 701 of FIG. 7 when the default values are set for Vcom (402) and for the gamma voltage pairs (403 and 404) from full white (gamma 9) to full black (gamma 1). Monotonicity of light transmission along the gray scale range may be checked in step 702, and if there is not monotonicity (703), the white and black endpoints may be brought closer together until a monotonic curve is achieved (704).

After monotonicity is achieved, the panel may be driven to mid-gray level (705) and Vcom may be optimized in step 706 by minimizing flicker via the process disclosed in FIG. 6. Vcom may then be held constant at this level for the remainder of the optimization process.

In step 707, the high and low voltage pair at a particular gamma level may be balanced by minimizing flicker via the process generally described in FIG. 6. In this context, the voltage on the abscissa in FIG. 6 generally refers to the average voltage of the Vhigh and Vlow pair. The average may be changed by incrementally increasing or decreasing the pair in the same direction by the same magnitude. It is to be understood that the use of historical data is contemplated by the present invention to aid with arriving at the number and magnitude of the incremental changes in voltage needed to arrive at the balanced pair.

Figure 8:
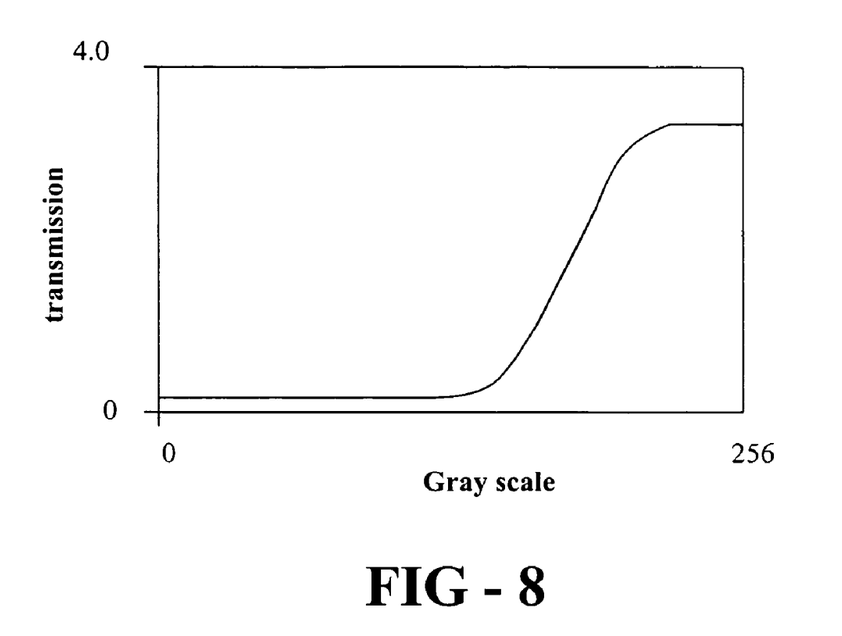
FIG. 8 is a graph depicting a typical signature gamma curve for a DUT.
Figure 9:
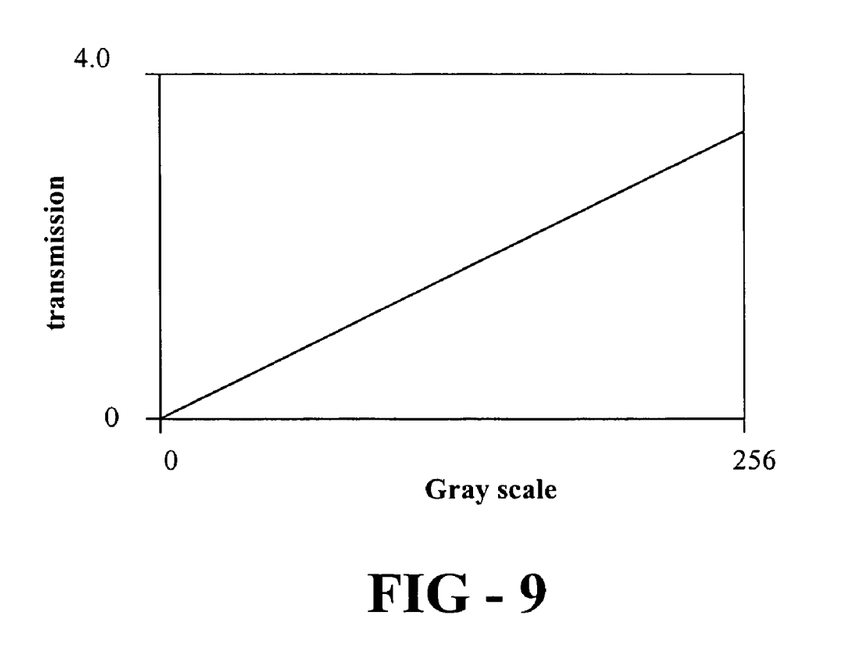
FIG. 9 is a graph depicting a typical resulting gamma curve that has been tailored to the end-user's request.

In step 708, the balanced voltage pair from step 707 may be adjusted to tailor the light transmission at the given gamma level to the end-user requirements—i.e. to adjust the panel's natural, or signature light transmission versus gray level curve (FIG. 8) to a tailored end-user gamma curve, e.g. FIG. 9. In general, the tailoring may be achieved by adjusting the voltage pair average applied to the subpixels at a given gray scale input command from the end-user's system. This may be accomplished by, for example, 10 bit D/A converters (114 in FIG. 1) attached to the DUT that automatically adjust the input digital voltage level to a corrected analog signal. The tailoring correction coefficients may be derived by moving the absolute value of the magnitude of the high or low voltage differential from the average—that is, moving the high and low voltage either closer together or farther apart by about equal steps. It is to be understood that the use of historical data to minimize the number of steps necessary to arrive at the tailored voltage pair coefficients is contemplated by the present invention.

In step 709, the balancing and tailoring needed to arrive at a pair of coefficients (steps 707 and 708) for a given gamma level may be repeated for the remaining uncorrected gamma levels. The coefficients may be stored in step 710 into an EPROM chip (113 in FIG. 1) attached to the DUT via a spreadsheet application run on the system controller (111 in FIG. 1).

FIGS. 8 and 9 respectively demonstrate an exemplary signature gamma curve for a DUT and a corrected gamma curve which is tailored to the end-user's request. "Transmission" refers to the luminance, or brightness level. Tailored gamma curves, as shown in FIG. 9, may thereby be achieved by the present invention in a manner which is highly repeatable through automation, and which requires minimum time and human interaction.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, it will be within the ability of one of ordinary skill in the art to make alterations or modifications to the present invention, such as through the substitution of equivalent materials or structural arrangements, or through the use of equivalent process steps, so as to be able to practice the present invention without departing from its spirit as reflected in the appended claims, the text and teaching of which are hereby incorporated by reference herein. It is the intention, therefore, to limit the invention only as indicated by the scope of the claims and equivalents thereof.

What is claimed is:

1. A method for optimizing the display characteristics of a visual display panel having a common voltage and having a range of gamma voltages, said visual display panel comprising subpixels, said subpixels having subpixel voltages, said method comprising the steps of:
  maximizing a range of gamma voltages between a black gamma voltage and a white gamma voltage while maintaining monotonicity;
  minimizing flicker by adjusting a common voltage while said subpixels are driven to a mid-gray level of said range of gamma voltages; and
  minimizing flicker at each gamma level by adjusting said subpixel voltages while holding said common voltage constant.

2. A method for optimizing and tailoring the display characteristics of a visual display panel having a common voltage and having a range of gamma voltages extending from a black gamma voltage to a white gamma voltage, said visual display panel comprising subpixels, said subpixels having subpixel voltages, said method comprising the steps of:
  maximizing said range of gamma voltages between said black gamma voltage and said white gamma voltage while maintaining monotonicity;
  minimizing flicker by adjusting said common voltage while said subpixels are driven to a predetermined level of said range of gamma voltages;
  minimizing flicker at each particular gamma level by adjusting said subpixel voltage while holding said common voltage constant; and
  adjusting said subpixel voltage at each particular gamma level while measuring said visual display panel's optical transmission level and fixing said subpixel voltages when a desired optical transmission level is achieved.

3. The method of claim 2 wherein adjusting said subpixel voltage to achieve flicker minimization is accomplished utilizing historical data.

4. The method of claim 2 further comprising the step of storing said common voltage and subpixel adjustment coefficient harmonization parameters in a look-up table associated with said visual display panel.

5. A system for optimizing the display characteristics of a visual display panel having a common voltage and having a range of gamma voltages extending from a black gamma voltage to a white gamma voltage, said visual display panel comprising subpixels, said subpixels having subpixel voltages, by measuring and harmonizing the voltage settings of said visual display panel, said system comprising:
  an optical instrument for measuring at least one electro-optical characteristic of said visual display panel;
  a controller for harmonizing said visual display panel's voltage settings;
  at least one voltage adjuster for adjusting said common voltage and said subpixel voltages to achieve harmonized display performance;
  a translational stage for moving said optical instrument relative to said visual display panel in at least one of a plurality of generally orthogonal directions, said optical instrument being mounted on said translational stage;
  a rotational stage for rotating said visual display panel about at least one generally orthogonal axis, said visual display panel being mounted on said rotational stage; and
  at least one controller for controlling said translational stage and said rotational stage to position said optical instrument at a desired position relative to the visual display panel and to position said visual display panel at a desired viewing angle relative to said optical instrument.

6. The system of claim 5 wherein said harmonizing comprises the step of adjusting and recording said common voltage while measuring flicker so that flicker is minimized at each gamma level.

7. The system of claim 6 wherein said harmonizing comprises the step of adjusting and recording said subpixel voltage while measuring flicker so that flicker is minimized at a given gamma level.

8. The system of claim 5 wherein said harmonizing comprises the steps of:
  maximizing said range of gamma voltages between said black gamma voltage and said white gamma voltage while maintaining monotonicity;
  minimizing flicker by adjusting said common voltage while said subpixels are driven to a predetermined level of said range of gamma voltages; and
  minimizing flicker at each gamma level by adjusting said subpixel voltages while holding said common voltage constant.

9. The system of claim 5 wherein said visual display characteristics are also tailored, said harmonization and tailoring comprising the steps of:
  maximizing said range of gamma voltages between said black gamma voltage and said white gamma voltage while maintaining monotonicity;
  minimizing flicker by adjusting said common voltage while said subpixels are driven to a gray level of said range of gamma voltages;
  minimizing flicker at each particular gamma level by adjusting said subpixel voltage while holding said common voltage constant; and
  adjusting said subpixel voltages at each particular gamma level while measuring said visual display panel's optical transmission level and fixing said subpixel voltages when a desired transmission level is achieved.

10. The system of claim 5 wherein said at least one voltage adapter utilizes voltage correction coefficients to achieve said harmonized display performance.

11. The system of claim 10 wherein said controller for harmonizing said visual display panel stores said voltage correction coefficients in a look up table in memory.

12. The system of claim 11 wherein said memory is an EPROM attached to said visual display panel.

13. The system of claim 5 wherein said at least one voltage adjuster is attached to said visual display panel.

14. The system of claim 5 wherein said optical instrument is a photomultiplier tube (PMT) photometer.

* * * * *